(12) United States Patent
Grelin et al.

(10) Patent No.: US 11,879,361 B2
(45) Date of Patent: Jan. 23, 2024

(54) VANE MADE OF COMPOSITE MATERIAL FOR A TURBINE ENGINE STATOR INCLUDING A HOLLOW CORE MADE OF NON-POROUS PLASTIC

(71) Applicant: SAFRAN AIRCRAFT ENGINES, Paris (FR)

(72) Inventors: Hervé Grelin, Moissy-Cramayel (FR); Laurent Jean Baptiste Baroumes, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 17/904,043

(22) PCT Filed: Feb. 9, 2021

(86) PCT No.: PCT/FR2021/050231
§ 371 (c)(1),
(2) Date: Aug. 11, 2022

(87) PCT Pub. No.: WO2021/160961
PCT Pub. Date: Aug. 19, 2021

(65) Prior Publication Data
US 2023/0093021 A1     Mar. 23, 2023

(30) Foreign Application Priority Data
Feb. 14, 2020    (FR) ...................................... 2001506

(51) Int. Cl.
*F01D 9/04*     (2006.01)
*B29C 70/24*     (2006.01)
(Continued)

(52) U.S. Cl.
CPC .............. *F01D 9/041* (2013.01); *B29C 70/24* (2013.01); *B29C 70/48* (2013.01); *B29C 70/86* (2013.01);
(Continued)

(58) Field of Classification Search
CPC ................. F01D 5/282; F05D 2300/44; F05D 2300/6012; F05D 2300/603; F05D 2300/6034; B29C 70/462; B29L 2031/08
See application file for complete search history.

(56) References Cited

U.S. PATENT DOCUMENTS 5,308,228 A * 5/1994 Benoit ................... F01D 5/282
                                                                      156/93
10,414,487 B2 * 9/2019 Laurenceau ............ B64C 11/26
(Continued)

FOREIGN PATENT DOCUMENTS

| EP | 1852572 A2 | 11/2007 |
|---|---|---|
| EP | 2177752 A1 | 4/2010 |

(Continued)

OTHER PUBLICATIONS

International Search Report for issued in Application No. PCT/FR2021/050231 dated Mar. 19, 2021.
(Continued)

*Primary Examiner* — Courtney D Heinle
*Assistant Examiner* — Danielle M. Christensen
(74) *Attorney, Agent, or Firm* — Pearne & Gordon LLP

(57) ABSTRACT

A vane for a turbine engine includes a body in the form of an aerodynamic profile formed by a shell produced from a composite material formed from a three-dimensional textile of reinforcement fibres consolidated by a hardened resin. The shell forms a pressure surface and a suction surface of the vane connected to each other while forming on one side a leading edge and on the opposite side a trailing edge of the
(Continued)

vane, and a core including a core body surrounded by the shell. The core is produced from non-porous plastics material, and the core body is in the form of an aerodynamic profile and delimits at least one closed cavity of the core.

14 Claims, 7 Drawing Sheets

(51) Int. Cl.
*B29C 70/48* (2006.01)
*B29C 70/86* (2006.01)
*F01D 5/14* (2006.01)
*B29L 31/08* (2006.01)

(52) U.S. Cl.
CPC .......... *F01D 5/147* (2013.01); *B29L 2031/08* (2013.01); *F05D 2230/20* (2013.01); *F05D 2300/6012* (2013.01)

(56) References Cited

U.S. PATENT DOCUMENTS

| | | | |
|---|---|---|---|
| 10,508,559 B2* | 12/2019 | Gimat | F01D 25/24 |
| 2010/0150707 A1 | 6/2010 | Jevons | |
| 2013/0017093 A1 | 1/2013 | Coupe et al. | |
| 2022/0275728 A1* | 9/2022 | Morrison | F01D 5/282 |

FOREIGN PATENT DOCUMENTS

| | | | |
|---|---|---|---|
| EP | 3075963 A1 | 10/2016 | |
| FR | 2940173 A1 | 6/2010 | |
| WO | 2005000566 A1 | 1/2005 | |
| WO | 2011026009 A1 | 3/2011 | |

OTHER PUBLICATIONS

Written Opinion for PCT/FR2021/050231 dated Mar. 19, 2021.
Search Report issued in French Patent Application No. 2001506 dated Jul. 24, 2020.

\* cited by examiner

VANE MADE OF COMPOSITE MATERIAL FOR A TURBINE ENGINE STATOR INCLUDING A HOLLOW CORE MADE OF NON-POROUS PLASTIC

This is the National Stage of PCT international application PCT/FR2021/050231, filed on Feb. 9, 2021 entitled "VANE MADE OF COMPOSITE MATERIAL FOR A TURBINE ENGINE STATOR INCLUDING A HOLLOW CORE MADE OF NON-POROUS PLASTIC", which claims the priority of French Patent Application No. 2001506 filed Feb. 14, 2020, both of which are incorporated herein by reference in their entireties.

TECHNICAL FIELD

The present invention relates to the field of vanes made from composite material forming part of stator parts of turbine engines such as rings of outlet guide vanes (or "OGVs"),

PRIOR ART

An outlet guide vane ring includes vanes having an aerodynamic function, consisting in regulating the secondary air flow downstream of the fan. In some turbine engines, at least some of the outlet guide vanes fulfil a structural role, i.e. participate in the transmission of forces between the hub and the outer shroud of the outlet guide vane ring.

Moreover, the increasing requirements in terms of lightening turbine engines contribute to making more widespread the techniques for manufacturing such outlet guide vanes, and other stator vanes, from composite material with an organic matrix, in particular a material comprising reinforcement fibres forming a three-dimensional textile.

In this context, it has in particular appeared desirable to produce a stator vane comprising a body in the form of an aerodynamic profile formed by a shell produced from a composite material formed from a three-dimensional textile of reinforcement fibres consolidated by a hardened resin, a shell forming a pressure surface of the vane and a suction surface of the vane connected to each other while forming, on one side, a leading edge of the vane and, on the opposite side, a trailing edge of the vane, and a core comprising a core body surrounded by the shell.

Such a configuration of the vane makes it possible to lighten the vane, by using a core having a total density that is lower than that of the shell.

For this purpose, it has in particular been envisaged producing such a core from foam.

One difficulty, in this case, nevertheless lies in the need not to damage or break the core during the manufacture of the vane, in particular when the core is inserted in a passage formed in a fibrous preform intended to form the aerodynamic shell of the vane, before consolidation of this fibrous preform by means of the resin.

However, the foams available for this type of application prove to be too fragile for supporting these operations without damage.

In addition, the fragility of such foams would limit the possibilities of reducing the weight of such a core, and therefore of such a vane.

DESCRIPTION OF THE INVENTION

The aim of the invention is in particular to provide a simple, economical and effective solution to these problems.

It proposes for this purpose a vane fora turbine engine stator of the type described above, wherein the core is produced from non-porous plastics material and the core body is in the form of an aerodynamic profile and delimits at least a closed cavity of the core.

The closed cavity enables the core to be lightened. The core thus affords a reduction in weight of the vane, while offering good resistance to the forces liable to be applied to the core during manufacture of the vane, as will appear more clearly hereinafter. In addition, the aerodynamic profile form of the core body makes it possible to confer the appropriate shape on the shell during the manufacture of the vane, as will appear more clearly hereinafter.

Preferably, the shell is extended beyond the core body thereby forming a vane root and a vane head extending respectively at two opposite ends of the body of the vane and by means of which the vane is able to be attached respectively to a hub and an outer shroud of a bladed stator ring of a turbine engine.

Preferably, the core includes two core portions connected to each other.

The invention also relates to a bladed stator ring for a turbine engine, comprising a hub and an outer shroud connected to each other by at least one vane of the type described above.

The invention also relates to a turbine engine comprising at least one vane of the type described above or at least one bladed ring of the type described above.

The invention also relates to a method for manufacturing a vane for a turbine engine stator, comprising at least the following steps:

A) manufacturing a fibrous preform comprising two portions separated from each other by a passage and connected to each other on either side of the passage;

B) preparing an assembly composed of the fibrous preform and of a core produced from non-porous plastics material comprising a core body in the form of an aerodynamic profile that delimits at least a closed cavity of the core, the core body being housed in the passage of the fibrous preform, so that the fibrous preform has a pressure part and a suction part separated from each other by the core body and connected to each other on either side of the core body thereby forming a leading-edge part and a trailing-edge part; then C) consolidating the fibrous preform by means of a resin, by a liquid composite moulding method, so as to form a shell wherein the pressure part of the fibrous preform forms a pressure surface of the vane, the suction part of the fibrous preform forms a suction surface of the vane, the leading-edge part of the fibrous preform forms a leading edge of the vane, and the trailing-edge part of the fibrous preform forms a trailing edge of the vane.

In a preferred embodiment of the invention, the step B comprises at least the following steps:

b1) manufacturing the core; then
b2) inserting the core body in the passage of the fibrous preform.

In a second preferred embodiment of the invention, the step B comprises at least the following steps:

b1') manufacturing the core portions separately, among which at least one first core portion includes or forms a respective core body portion; then
b2') inserting at least the core body portion of the first core portion in the passage of the fibrous preform, then
b3') connecting the core portions to each other or to one another, joining the respective ends of the core portions sealingly, so that the core portions conjointly form the core, and so that at least the core body portion of the first core portion forms the core body of the core.

Preferably, at least a second core portion, among the core portions manufactured at the step b1', includes or forms a respective core body portion, the step b2' furthermore comprises inserting the core body portion of the second core portion in the passage of the fibrous preform, and connecting the core portions to one another at the step b3' comprises at least connecting the second core portion to the first core portion by joining the respective junction ends of the respective core body portions of the first and second core portions sealingly in the passage.

Preferably, the respective junction ends of the respective core body portions of the first and second core portions intercept two opposite openings of the passage, at the end of the step b3'.

In a variant, the respective junction ends of the respective core body portions of the first and second core portions extend substantially transversely to a span direction of the core, at the end of the step b3'.

In embodiments of the invention, the closed cavity of the core formed at the step b2' is formed conjointly by two respective open cavities of the first and second core portions manufactured at the step b1', the two open cavities each opening out in the corresponding junction end.

In embodiments of the invention, two core portions, from the core portions manufactured at the step b1', each include or form a corresponding end part of the core having a splayed shape as far as a corresponding end of the core.

In embodiments of the invention, the step A comprises manufacturing the fibrous preform by three-dimensional weaving, by weaving weft threads through a cluster of warp threads arranged in a plurality of layers, and by practising a partial non-interlinking between two layers of warp threads, so that said partial non-interlinking forms the passage separating the two portions of the fibrous preform.

BRIEF DESCRIPTION OF THE DRAWINGS

The invention will be best understood, and other details, advantages and features thereof will emerge from the reading of the following description made by way of non-limitative example with reference to the accompanying drawings, wherein.

In all these figures, identical references can designate identical or similar elements.

DETAILED DESCRIPTION OF PARTICULAR EMBODIMENTS

Figure 1:
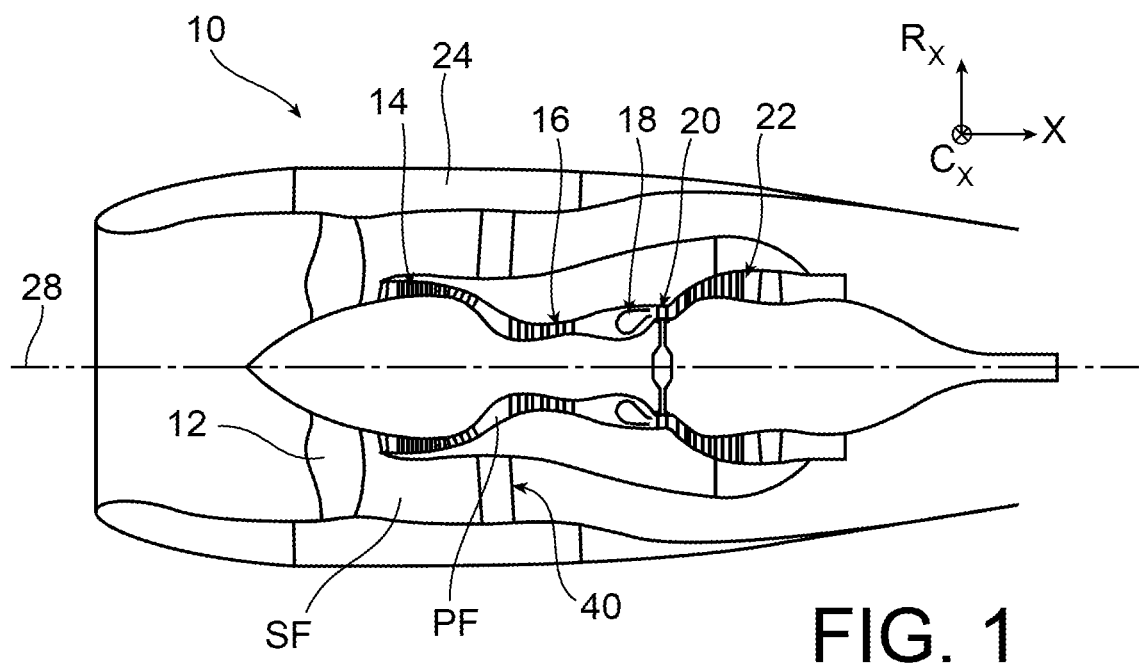
FIG. 1 is a schematic view in axial section of a turbine engine for an aircraft.

FIG. 1 illustrates a turbine engine 10 for an aircraft of a known type, including in general terms a fan 12 intended for sucking an airflow dividing downstream of the fan into a primary flow circulating in a flow channel for primary flow, hereinafter referred to as primary flow path PF, in a core of the turbine engine, and a secondary flow passing round this core in a flow channel for secondary flow, hereinafter referred to as secondary flow path SF.

The turbine engine is for example of the bypass and twin-spool type. The core of the turbine engine thus includes, in general terms, a low-pressure compressor 14, a high-pressure compressor 16, a combustion chamber 18, a high-pressure turbine 20 and a low-pressure turbine 22.

The respective rotors of the high-pressure compressor and of the high-pressure turbine are connected by a rotor shaft referred to as "high-pressure shaft", while the respective rotors of the low-pressure compressor and of the low-pressure turbine are connected by a rotor shaft referred to as "low-pressure shaft".

The turbine engine is streamlined by a nacelle 24 surrounding the secondary flow path SF.

The rotor shafts are mounted so as to rotate about an axis 28 of the turbine engine.

Throughout this description, the axial direction X is the direction of the axis 28. The radial direction $R_x$ is at every point a direction orthogonal to the axis 28 and passing through the latter, and the circumferential direction $C_x$ is at every point a direction orthogonal to the radial direction $R_x$ and to the axis 28. The terms "inner" and "outer" refer respectively to a relative proximity, and a relative distancing, of an element with respect to the axis 28. Finally, the directions "upstream" and "downstream" are defined with reference to the general direction of the flow of the gases in the primary flow path PF and secondary flow path SF of the turbine engine, in the axial direction X.

Figure 2:
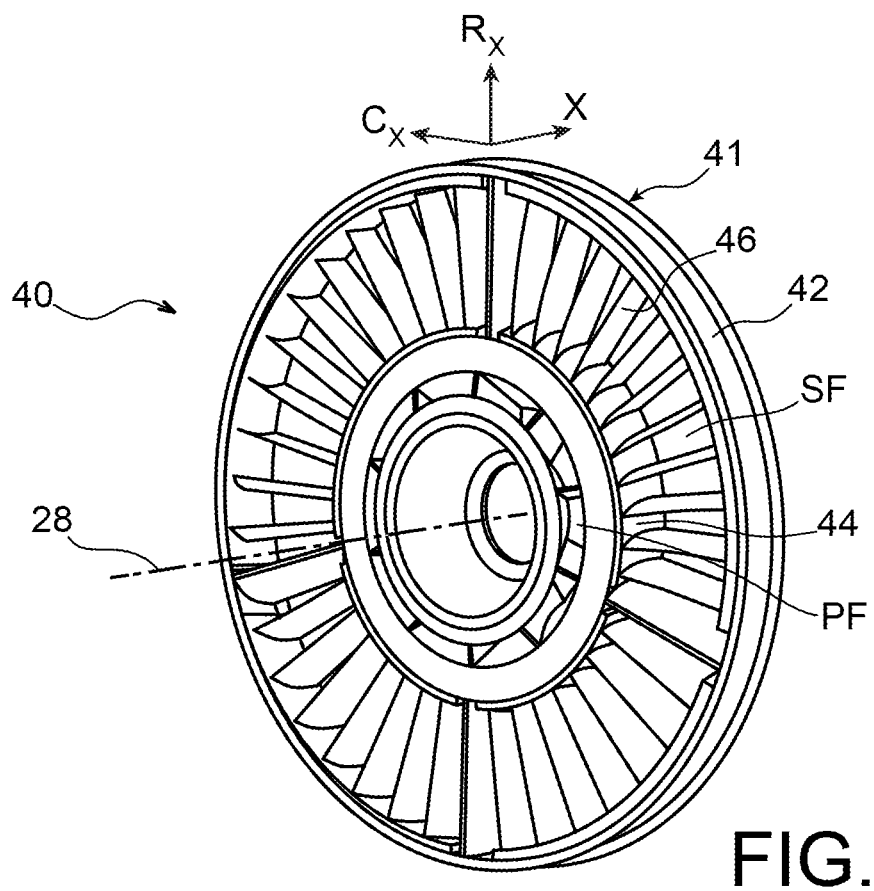
FIG. 2 is a perspective schematic view of a bladed ring, such as an outlet guide vane ring, forming part of the turbine engine in FIG. 1 and illustrated in isolation.

The turbine engine comprises an intermediate casing 40 arranged downstream of the fan 12, axially between the low-pressure compressor 14 and the high-pressure compressor 16, and shown in isolation on FIG. 2.

This intermediate casing 40 includes a bladed ring 41, centred on the axis 28, and comprising an outer shroud 42, a hub 44, and vanes 46, normally referred to as outlet guide vanes ("OGVs"), which extend through the secondary flow path SF while connecting the outer shroud 42 to the hub 44.

The outer shroud 42 extends around the secondary flow path SF and the hub 44, while the hub 44 extends radially inwards with respect to the secondary flow path SF, and radially outwards with respect to the primary flow path PF.

The present invention is particularly advantageous when some or all of the vanes 46 fulfil a structural function, i.e. transmit connection forces between two parts, for example between the hub 44 and the outer shroud 42, as will appear more clearly hereinafter. The invention can nevertheless also be applied to vanes not fulfilling such a structural function. The invention is also applicable to stator vanes disposed in another location of a turbine engine.

Figure 3:
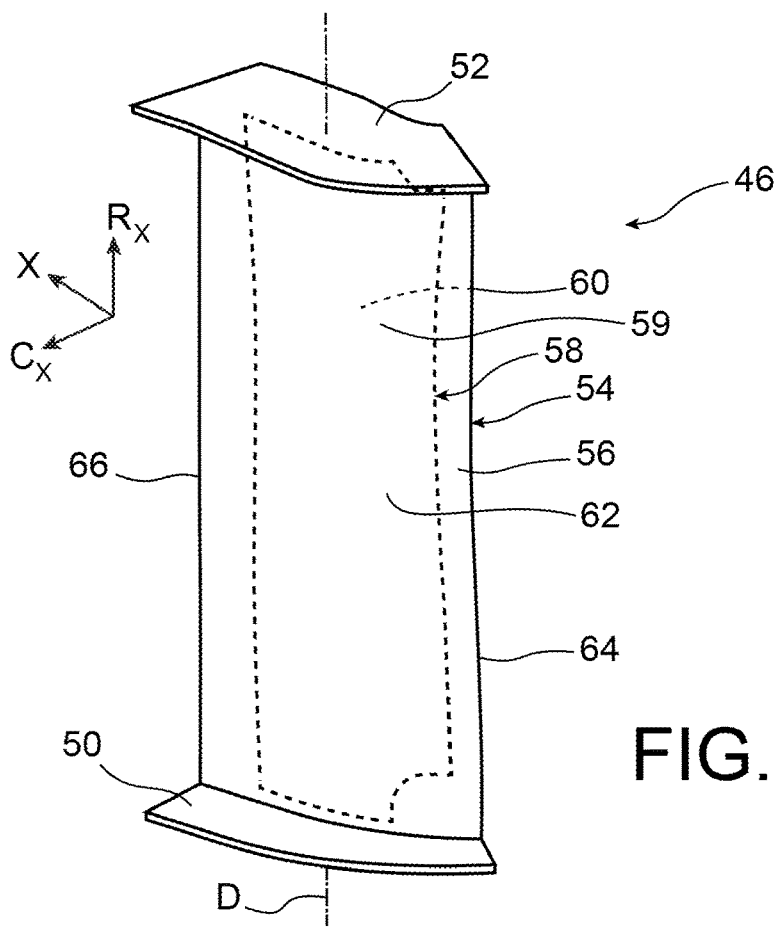
FIG. 3 is a perspective schematic view of a vane for a turbine engine stator according to the invention, intended for example to form part of the bladed ring of FIG. 2.

As shown by FIG. 3, a vane 46 includes in general terms a blade root 50 and a blade head 52 arranged respectively at two opposite ends of the vane, and a body 54 in the form of an aerodynamic profile, sometimes referred to as a blade, extending in a span direction D of the vane, connecting the blade root 50 to the blade head 52 (the span direction D generally being a radial direction defined as a mid-plane of the vane). The blade root 50 is intended to be attached to the hub 44, and the blade head 52 is intended to be connected to the outer shroud 42, which can be accomplished by a known technique and will not be described in detail here.

The body 54 of the vane 46 is formed by a shell 56.

The vane 46 furthermore includes a core 58 including a core body 59 surrounded by the shell 56.

The shell 56 is produced from a composite material formed by reinforcement fibres consolidated by a hardened organic resin, for example an epoxy resin.

The shell 56 forms a pressure surface 60 of the vane 46 and a suction surface 62 of the vane 46. The pressure surface 60 and the suction surface 62 are arranged on either side of the core body 59 and are connected to each other beyond the core body 59, on one side forming a leading edge 64 of the vane 46 and on an opposite side forming trailing edge 66 of the vane 46.

In the example illustrated, the shell 56 is extended beyond the core body 59 thus forming the blade root 50 and the blade head 52 extending respectively at two opposite ends of the body 54 of the vane.

Figure 5:
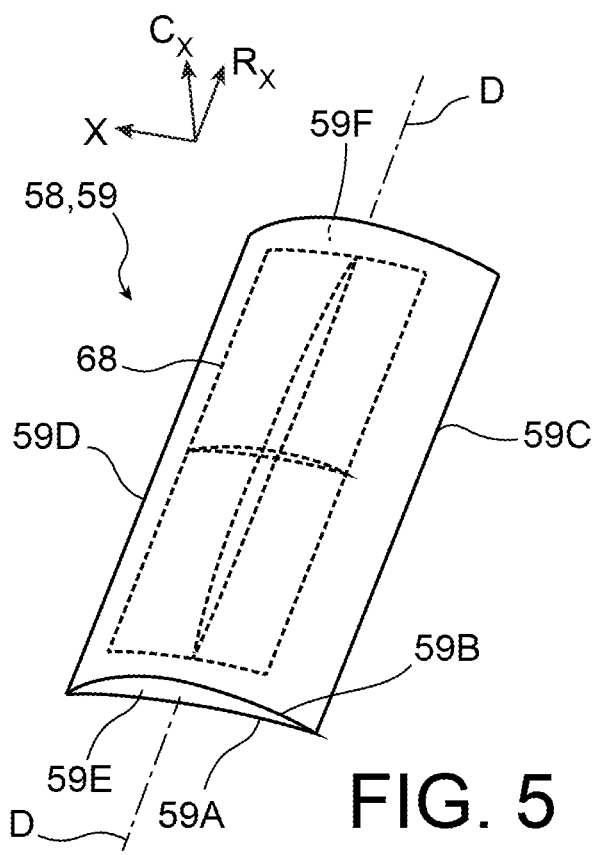
FIG. 5 is a perspective schematic view of a core of the vane of FIG. 3, according to a first preferred embodiment of the invention.

The core 58, visible alone on FIG. 5, is produced from a non-porous plastics material.

The plastics material constituting the core 58 is preferably a thermoplastic material, for example a polyetheretherketone (PEEK) or a polyetherimide (PEI). These materials provide thermal and mechanical stability at high temperature, and are thus particularly adapted to the curing cycles in the context of the low-pressure resin injection moulding methods (RTM).

In addition, the core body 59 is in the form of an aerodynamic profile, i.e. in the form of a vane. In other words, the core body 59 has a pressure surface 59A and a suction surface 59B connected to each other, on one side forming a leading edge 59C of the core body and on the other side forming a trailing edge 59D of the core body.

In the example illustrated on FIG. 5, the core 58 is entirely formed by the core body 59.

The core body 59 furthermore includes a closed cavity 68 (FIG. 5) or a plurality of closed cavities.

The closed cavity 68 (or each closed cavity) of the core body 59 provides an advantageous lightening of the core, and therefore additional lightening of the vane 46.

In other words, the core body 59 is formed by two profiled walls that respectively define the pressure surface 59A and the suction surface 59B of the core body 59 and which are separated from each other by the closed cavity (or all the closed cavities) and connected to each other on either side of the closed cavity (or of all the closed cavities) thus forming the leading edge 59C and the trailing edge 59D of the core body 59, as well as an end on the root side 59E of the core body and an end on the head side 59F of the core body.

The closed cavity 68 (or all the closed cavities) thus has ends respectively on the side of the leading edge 59C of the core body and on the side of the trailing edge 59D of the core body, which are distant respectively from the leading edge 59C of the core body and from the trailing edge 59D of the core body.

Figure 4:
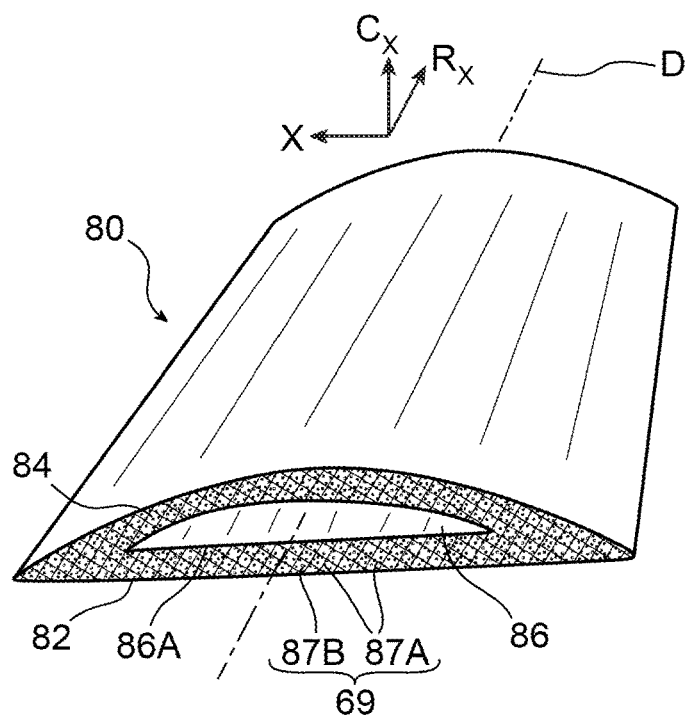
FIG. 4 is a perspective schematic view of a fibrous preform intended to constitute a shell of the vane of FIG. 3.

Moreover, the reinforcement fibres of the composite material forming the shell 56 (FIG. 3) are arranged in the form of a three-dimensional textile, also referred to as 3D textile, and more particularly in the form of a woven structure, which may consist of woven strips assembled together or a single three-dimensional woven structure. These reinforcement fibres 69 are visible on FIG. 4, which illustrates a fibrous preform intended to form the shell 56 after consolidation, as will appear more clearly hereinafter.

The shell 56 thus has optimum strength, which is particularly advantageous in the case where the shell 56 must confer a structural function on the vane 46. The core 58 is in fact not designed to contribute to such a structural function of the vane 46. The strength of the vane 46 is in particular advantageous in the case of impact or ingestion of a foreign body in the turbine engine.

In general terms, the core 58 therefore allows a reduction in mass of the vane 46, while offering good resistance to the forces liable to be applied to the core during the manufacture of the vane 46. In addition, the profiled shape of the core body 59 makes it possible to confer the appropriate form on the shell 56 during the consolidation of the resin, as will appear more clearly hereinafter.

A method for manufacturing a vane for a turbine engine stator, such as the vane 46, consists, in general terms, in:

A) manufacturing a fibrous preform 80 (FIG. 4) comprising two portions 82, 84 separated from each other by a passage 86 and connected to each other on either side of the passage 86;

B) preparing an assembly composed of the fibrous preform 80 and the core 58, wherein the core body 59 is housed in the passage 86 of the fibrous preform, 80 (FIG. 6), so that the fibrous preform 80 has a pressure part 72 and a suction part 74 separated from each other by the core body 59 and connected to each other on either side of the core body 59 forming a leading-edge part 76 and a trailing-edge part 78; and C) consolidating the fibrous preform 80 by means of a resin, by a liquid composite moulding (LCM) method, so as to form the shell 56, wherein the pressure part 72 of the fibrous preform 80 (FIG. 6) forms the pressure surface 60 of the vane (FIG. 3), the suction part 74 of the fibrous preform 80 (FIG. 6) forms the suction surface 62 of the vane (FIG. 3), the leading-edge part 76 of the fibrous preform 80 (FIG. 6) forms the leading edge 64 of the vane (FIG. 3), and the trailing-edge part 78 of the fibrous preform 80 (FIG. 6) forms the trailing edge 66 of the vane (FIG. 3).

Preferably, the step A comprises the manufacture of the fibrous preform 80 by three-dimensional weaving, weaving the weft threads 87A through a cluster of warp threads 87B arranged in a plurality of layers, and effecting a partial non-interlinking between two layers of warp threads, for example by means of the method disclosed in the document FR2940173 (or the equivalent thereof in US 2011/318513), by means of which the partial non-interlinking forms the passage 86 separating the two portions 82, 84 of the fibrous preform 80.

Figure 6:
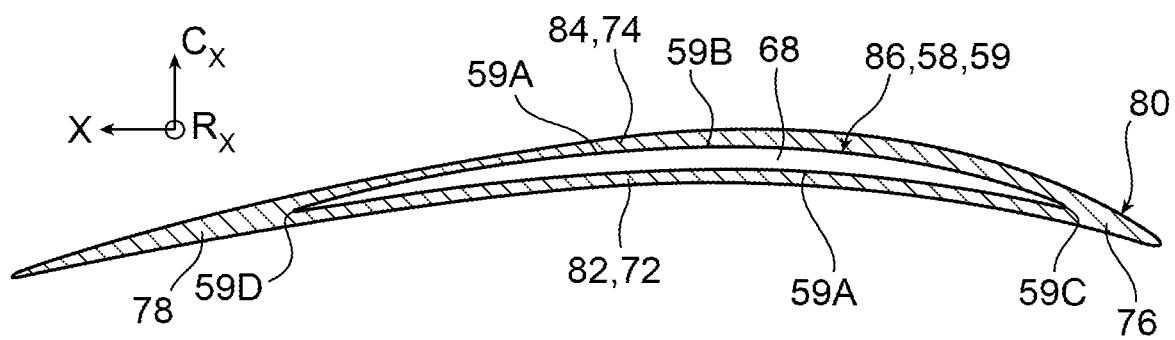
FIG. 6 is a schematic view in cross section of the vane of FIG. 3 before consolidation of the fibrous preform.
Figure 12:
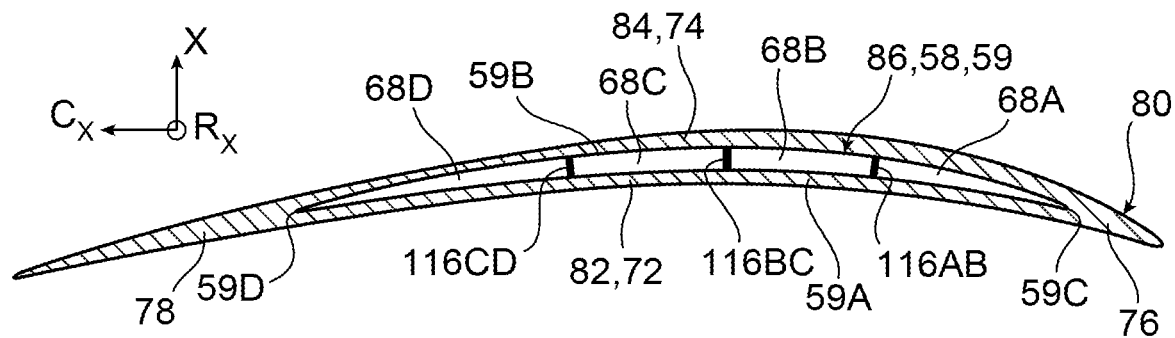
FIG. 12 is a view similar to FIG. 6, illustrating a variant of the vane according to the invention.

In a first preferred embodiment of the vane manufacturing method according to the invention, illustrated by the flow diagram in FIG. 12, the step B comprises the steps consisting in:

b1) manufacturing the core 58 (FIG. 5), then;

b2) inserting the core body 59 in the passage 86 of the fibrous preform 80 (FIG. 6).

The step b1 of manufacturing the core 58 is for example implemented by means of an injection-blowing or extrusion-blowing technique, in which cases the blowing point is next closed by means of a plug. The core 58 may, in a variant, be produced by means of a rotational moulding technique. These techniques enable the core 58 to be manufactured substantially in a single piece.

In a variant, the core 58 may be produced in a plurality of parts assembled together before the step b2 of inserting the core 58 in the passage 86, when the form of the core so permits. In this case, each of the parts of the core 58 can be produced for example by an injection moulding technique. The parts of the core 58 are next assembled for example by means of an ultrasonic welding technique, or by adhesive bonding, or by elastic snapping in with, if necessary, the interposing of a gasket between the parts.

Figure 9:
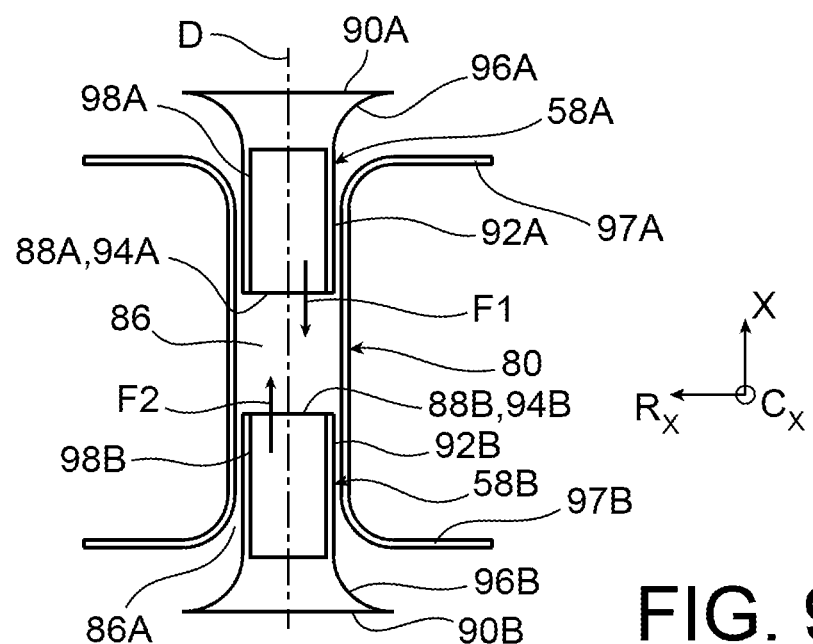
FIG. 9 is a schematic view in longitudinal section of a vane according to an embodiment of the invention during a step of a method of manufacturing the vane.
Figure 13:
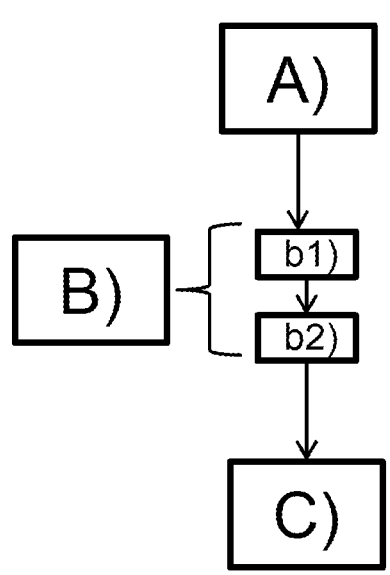
FIG. 13 is a flow diagram of the method for manufacturing the vane, according to the first preferred embodiment of the invention.
Figure 14:
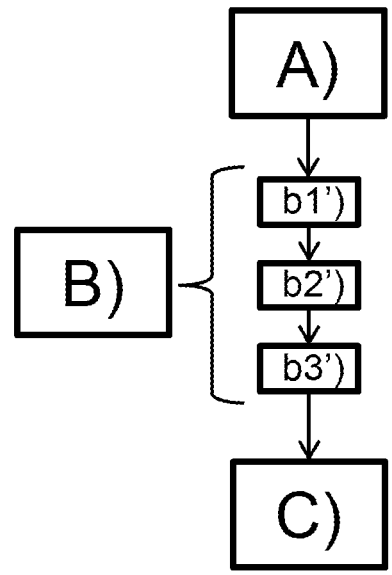
FIG. 14 is a flow diagram of the method for manufacturing the vane, according to the second preferred embodiment of the invention.

In a second preferred embodiment of the vane manufacturing method according to the invention, illustrated by the flow diagram in FIG. 13, the step B comprises the steps consisting in:

b1') manufacturing core portions separately, among which at least one first core portion includes or forms a respective core body portion; then b2') inserting at least the core body portion of the first core portion in the passage 86 of the fibrous preform 80 (FIG. 9: arrow F1); then b3') connecting the core portions to each other or to one another by joining the respective ends of the core portions sealingly, so that the core portions conjointly form the core 58, and so that at least the core body portion of the first core portion forms the core body 59 of the core 58 (FIG. 9).

The core portions are connected to each other or to one another for example by adhesive bonding or by elastic snapping in or by ultrasonic welding.

In general terms, producing the core 58 in a plurality of parts allows forms of the core 58 that would not be allowed by the insertion of the entire core 58 in the passage 86 of the fibrous preform 80.

Thus, in preferred embodiments, the step b1' comprises the manufacture of two core portions 58A, 58B (FIGS. 7 and 8) separately, the two core portions 58A, 58B each having a respective proximal end 88A, 88B and a respective distal end 90A, 90B, so that at least a first 58A of the two core portions includes a respective core body portion 92A having a respective junction end 94A forming the corresponding proximal end 88A. Next, the step b2' comprises the insertion of at least the respective core body portion 92A of the first core portion 58A in the passage 86 of the fibrous preform 80 (FIG. 9: arrow F1). Finally, the step b3' comprises connecting the second core portion 58B to the first core portion 58A by joining the respective proximal ends 88A, 88B of the two core portions 58A, 58B sealingly, so that the two core portions 58A, 58B conjointly form the core 58, and so that at least the core body portion 92A of the first core portion 58A forms the core body 59 of the core 58 (FIG. 9).

Figure 10:
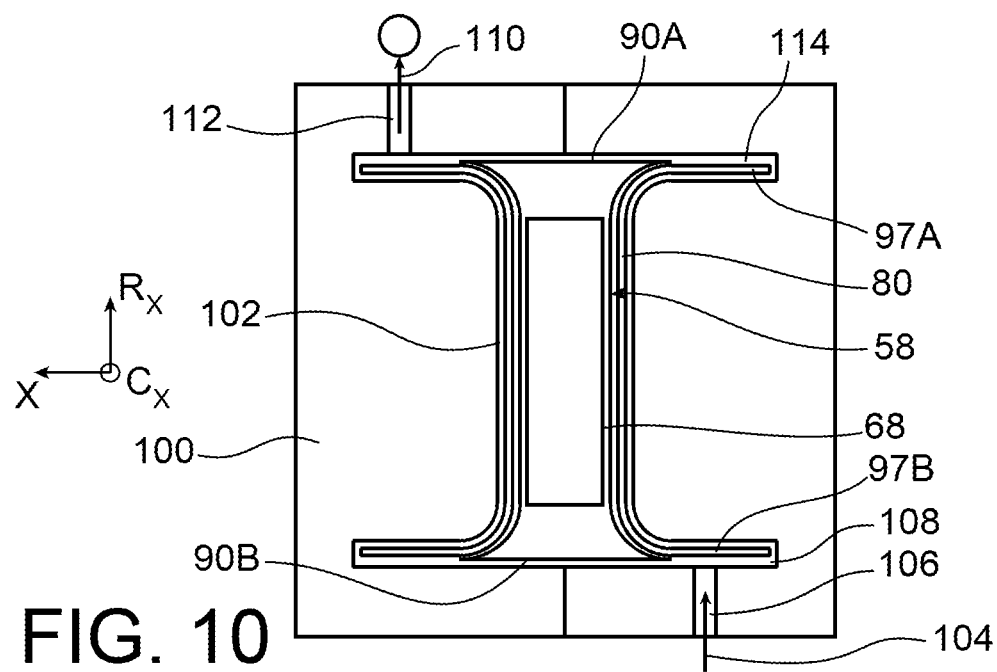
FIG. 10 is a view similar to FIG. 9, illustrating another subsequent step, of the method for manufacturing the vane.

In addition, each of the two core portions 58A, 58B manufactured at the step b1' includes a respective end part 96A, 96B with a shape splayed as far as the corresponding respective distal end 90A, 90B. The respective end parts 96A, 96B of the core portions 58A, 58B are respectively intended to serve as a support for two reinforcement fibre structures 97A, 97B (visible on FIGS. 9 and 10) intended, after consolidation by means of resin, to form respectively the blade root 50 and the blade head 52. These two reinforcement fibre structures 97A, 97B can form an integral part of the fibrous preform 80 surrounding the core body 59, or be attached to the fibrous preform 80.

Figure 7:
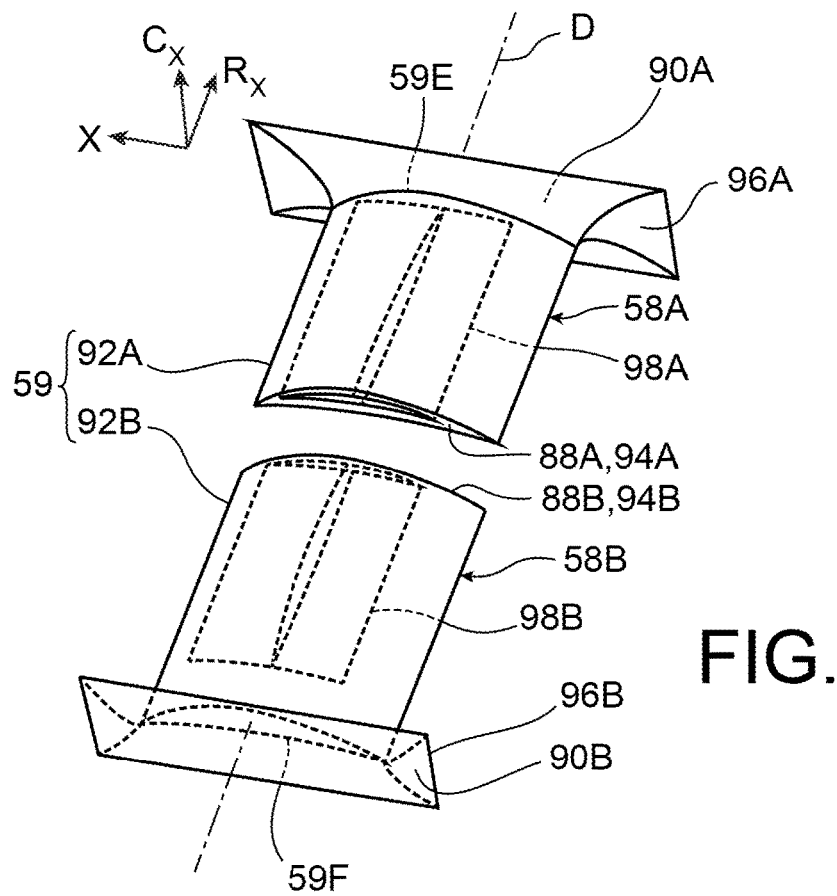
FIG. 7 is a perspective schematic view of two core portions intended to constitute a core of the vane of FIG. 3, according to a second preferred embodiment of the invention.

In the example illustrated on FIG. 7, the second core portion 58B manufactured at the step b1' also includes a respective core body portion 92B having a respective junction end 94B forming the corresponding proximal end 88B of the second core portion 58B.

In addition, the step b2' furthermore comprises inserting the core body portion 92B of the second core portion 58B in the passage 86 of the fibrous preform 80 (FIG. 9: arrow F2), and connecting the core portions to each other at the step b3' comprises at least connecting the second core portion 58B to the first core portion 58A by joining the respective junction ends 94A, 94B of the respective core body portions 92A, 92B of the first and second core portions 58A, 58B sealingly in the passage 86.

In this case, the two respective core body portions 92A, 92B of the two core portions 58A, 58B form together the core body 59 of the core 58, after assembly of the two core portions 58A, 58B.

In the example illustrated on FIG. 7, each of the two core portions 58A, 58B manufactured at the step b1' has a respective open cavity 98A, 98B formed at least in the corresponding core body portion 92A, 92B, and which opens out in the corresponding junction end 94A, 94B. After assembly of the core portions 58A, 58B, the two respective open cavities 98A, 98B communicate with each other so as to form together the closed cavity 68 of the core 58 formed at the step b3' (visible on FIG. 10).

In a variant, one of the two core portions 58A, 58B may include one or more closed cavities while the other core portion may include no cavity, or may include one or more other closed cavities.

Figure 8:
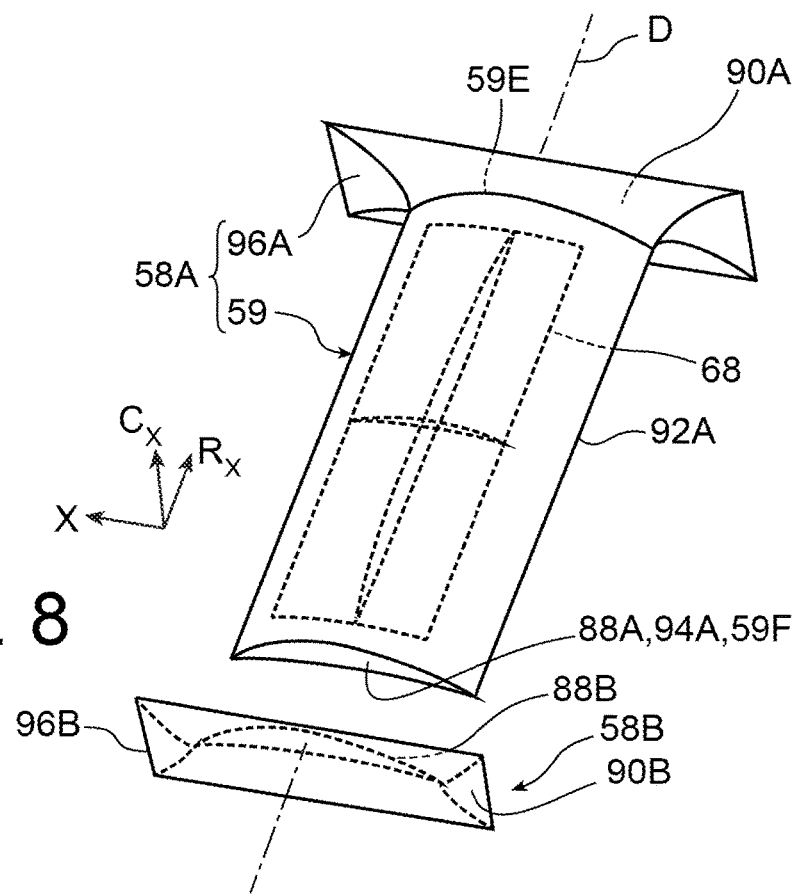
FIG. 8 is a perspective schematic view of two core portions intended to constitute a core of the vane of FIG. 3, according to a variant of the second preferred embodiment of the invention.

In a variant, in the example illustrated on FIG. 8, the second core portion 58B does not include a core body portion intended to form a part of the core body 59. The second core portion 58B consists solely of the corresponding respective end part 96B. The operation of connecting the core portions 58A, 58B to each other can in this case be done outside the passage 86 of the fibrous preform 80 after inserting the core body portion 92A in the passage 86.

In the example illustrated on FIG. 8, the closed cavity 68 is thus entirely formed in the first core portion 58A.

In the examples corresponding to FIGS. 7 and 8, the core portions 58A, 58B are joined along respective junction ends 94A, 94B of the corresponding core body portions 92A, 92B that extend substantially transversely to a span direction of the core 58, i.e. a direction going from the root end 59E to the head end 59F of the core body 59, which corresponds to the span direction D of the vane at the end of the manufacture of the latter. "Substantially transversely" must be understood to mean in general terms that the junction ends 94A, 94B do not intercept two opposite openings 86A, 86B of the passage 86 (FIGS. 4 and 9), at the end of the step b3'.

Thus, in the example of FIG. 7, the junction ends 94A, 94B are intended to be entirely housed in the passage 86, at a distance from the openings 86A, 86B thereof. The same applies in the example of FIG. 8, in the case where the two reinforcement fibre structures 97A, 97B, intended to form the vane root 50 and the vane head 52, form an integral part of the fibrous preform 80 surrounding the core body 59, or are attached to the fibrous preform 80 before the step b2', so that the reinforcement fibres 97A, 97B participate in delimiting the passage 86. Conversely, in the case where the reinforcement fibre structures 97A, 97B are attached to the fibrous preform 80 after the step b3', the junction ends 94A, 94B are intended to be entirely located outside the passage 86, before the reinforcement fibre structures 97A, 97B are attached to the fibrous preform 80.

The method moreover enables the core 58 to have a middle part that is wider than the passage 86 at its entrance, for example to form a vane having a chord length that is greater in a middle portion of the body of the vane than at the ends of the body of the vane.

Figure 11:
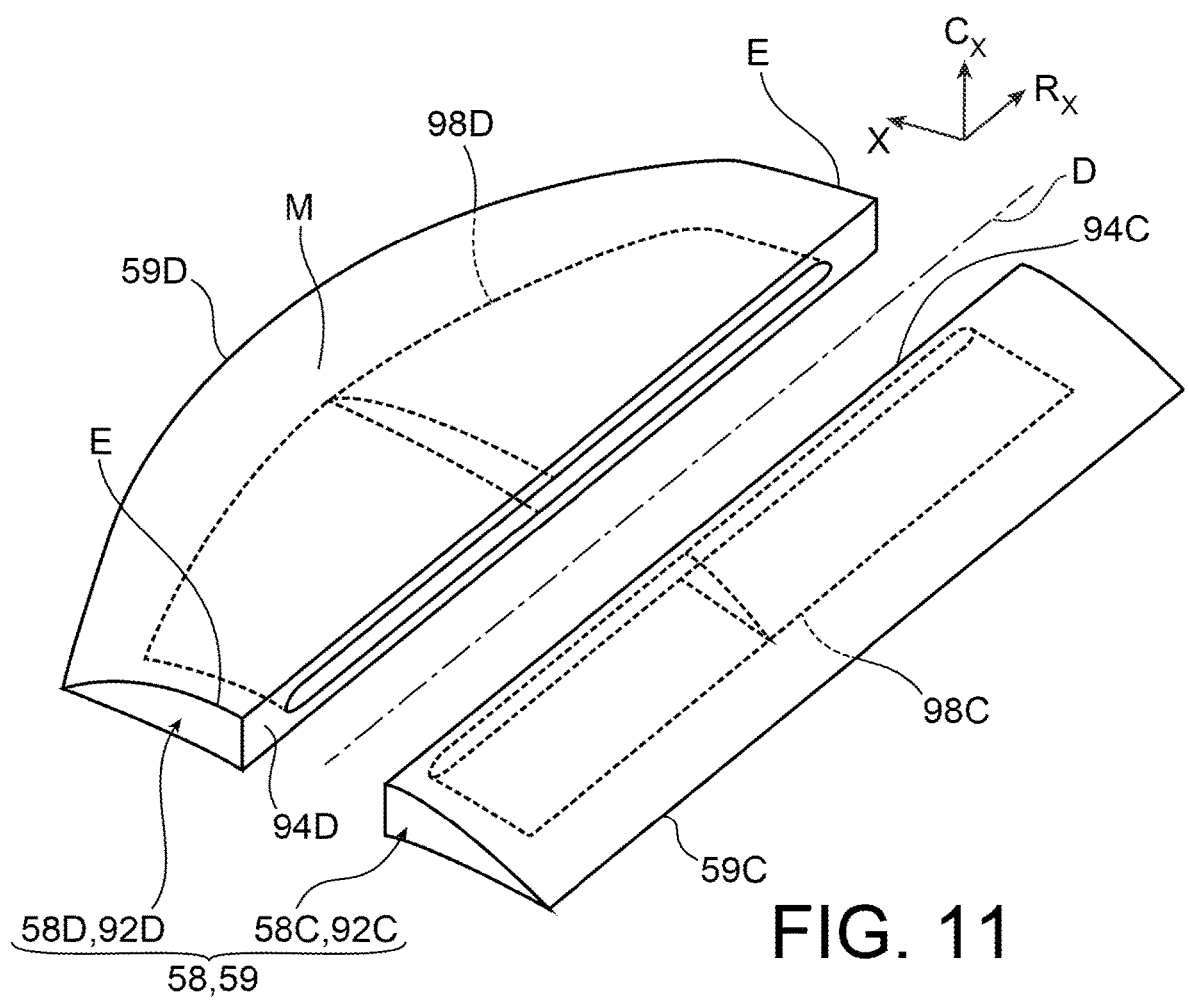
FIG. 11 is a perspective schematic view of two portions of a core intended to constitute a core of the vane of FIG. 3, according to another variant of the second preferred embodiment of the invention.

For this purpose, with reference to FIG. 11, the core 58 includes two core portions 58C, 58D respectively comprising or forming two core body portions 92C, 92D having respective junction ends 94C, 94D that intercept the two opposite openings 86A, 86B of the passage 86 (FIGS. 4 and 9), at the end of the step b3'.

In general terms, when a first one of the core portions is in place in the passage 86, before the other core portion is inserted, the first core portion can thus be offset transversely to the span direction of the core 58 corresponding to the span direction D of the vane, so as to enlarge the space remaining in the openings 86A, 86B of the passage 86 and thus enable another core portion to be inserted in the passage.

In the example of FIG. 11, the junction ends 94C, 94D thus extend in the span direction of the core 58.

In addition, one of the core body portions 92D has an end intended to form for example the trailing edge 59D of the core body 59. This edge has a curved shape so that a middle part M of the core body 59 is wider (transversely to the span direction D) than the ends E of the core body 59.

The step b2' in this case comprises inserting the core body portion 92B in the passage 86, then offsetting this core body portion 92D transversely to the span direction D so as to leave clear, at one of the openings 86A, 86B of the passage 86, a space through which the other core body portion 92C is next inserted.

Here again, each of the two core portions 58C, 58D manufactured at the step b1' has a respective open cavity 98C, 98D formed at least in the corresponding core body portion 92C, 92D, and which opens out in the corresponding junction end 94C, 94D. After assembly of the core portions 58C, 58D, the respective open cavities 98C, 98D communicate with each other so as to form together the closed cavity 68 of the core 58 formed at the step b3'.

In a variant, a core 58 can be formed both from core portions joined by junction ends that intercept the two opposite openings 86A, 86B of the passage 86, and from core portions joined by junction ends that do not intercept the two opposite openings 86A, 86B of the passage 86.

Such a variant is in particular advantageous in the case where the two reinforcement fibre structures 97A, 97B form an integral part of the fibrous preform 80 surrounding the core body 59, or are attached to the fibrous preform 80 before the step b2', so that the reinforcement fibre structures 97A, 97B participate in delimiting the passage 86, and where the core 58 includes both end parts with a splayed shape as on FIGS. 7 and 8 and a protruding middle part as on FIG. 11.

Moreover, the step b1 or b1' can indifferently be implemented before or after the step A.

The liquid composite moulding (LCM) method by means of which the fibrous preform 80 is consolidated at the step C is preferably a low-pressure resin injection moulding (RTM) method. Such a method comprises the placing of the assembly formed by the core 58 and the fibrous preform 80 in a cavity 102 of a mould 100 (FIG. 10), the injection of the thermosetting resin (arrow 104) through an injection channel 106 emerging, for example, facing a region 108 of the cavity 102 intended to constitute the vane root 50 (FIG. 3), until the resin fills an end-of-filling vent 112 (FIG. 10: arrow 110), for example arranged facing a region 114 of the cavity 102 intended to constitute the vane head 52 (FIG. 3). The method next includes the hardening of the resin resulting in the obtaining of the shell 56, and then the removal, from the mould, of the vane 46 thus obtained.

In a variant, the liquid composite moulding (LCM) method may be of the type known by the name Polyflex and presented in the document WO 2005/000566.

In some example embodiments, the connection between the shell 56 made from composite material and the core 58 made from non-porous plastics material is provided by a mechanical and chemical attachment of the epoxy resin forming the matrix of the composite material at the time of injection and hardening of the resin. However, it should be noted that the holding of the interface between the core 58 and the shell 56 is not necessary to the correct operation of the vane 46 and is therefore not a requirement in terms of specifications for conditions in service.

In a variant, as illustrated on FIG. 12, the core body 59 may include a plurality of closed cavities 68A, 68B, 68C, 68D, for example four in number, separated in pairs by a corresponding stiffener 116AB, 116BC, 116CD, in which case each of the closed cavities 68A, 68B, 68C, 68D can be formed in a single piece, in a similar manner to what is described above with reference to FIG. 8, or be formed by joining two open cavities facing each other, in a similar manner to what is described above with reference to FIG. 7 and FIG. 11.

The stiffeners 116AB, 116BC, 116CD may be continuous or discontinuous and preferably extend in the span direction of the core.

The stiffeners 116AB, 116BC, 116CD contribute to the rigidity of the core and therefore to its strength during the steps of injection and hardening of the resin and make it possible for example for the walls constituting the core body 59 to be thinner without compromising the rigidity of the core body 59. In addition, such a configuration can facilitate the injection of the plastics material constituting the core 58 or during the manufacture thereof.

DOCUMENTS CITED IN THE DESCRIPTION

FR2940173 and its equivalent in English language US2011/318513; WO2005/000566.

What is claimed is:
1. A vane for a turbine engine, comprising:
a body in the form of an aerodynamic profile formed by
a shell produced from a composite material formed by a three-dimensional textile of reinforcement fibres consolidated by a hardened resin, the shell forming a pressure surface of the vane and a suction surface of the vane connected to each other while forming, on one side, a leading edge of the vane, and on the opposite side a trailing edge of the vane, and
a core comprising a core body surrounded by the shell, wherein the core is produced from a non-porous plastics material, and the core body is in the form of an aerodynamic profile and delimits at least one closed cavity of the core.

2. The vane according to claim 1, wherein the shell is extended beyond the core body while forming a vane root and a vane head extending respectively at two opposite ends of the body of the vane and by means of which the vane is able to be attached respectively to a hub and an outer shroud of a bladed stator ring of a turbine engine.

3. The vane according to claim 1, wherein the core includes two core portions connected to each other.

4. A bladed stator ring for a turbine engine, comprising a hub and an outer shroud connected to each other by at least one vane according to claim 1.

5. A turbine engine, comprising at least one vane according to claim 1.

6. A method for manufacturing a vane for a turbine engine stator, comprising at least the following steps:
  A) manufacturing a fibrous preform comprising two portions separated from each other by a passage and connected to each other on either side of the passage;
  B) preparing an assembly composed of the fibrous preform and of a core produced from non-porous plastics material comprising a core body in the form of an aerodynamic profile that delimits at least a closed cavity of the core, the core body being housed in the passage of the fibrous preform, so that the fibrous preform has a pressure part and a suction part separated from each other by the core body and connected to each other on either side of the core body while forming a leading-edge part and a trailing-edge part; then
  C) consolidating the fibrous preform by means of a resin, by a liquid composite moulding method, so as to form a shell wherein the pressure part of the fibrous preform forms a pressure surface of the vane, the suction part of the fibrous preform forms a suction surface of the vane, the leading-edge part of the fibrous preform forms a leading edge of the vane, and the trailing-edge part of the fibrous preform forms a trailing edge of the vane.

7. The method according to claim 6, wherein step B comprises at least the following steps:
  b1) manufacturing the core; then
  b2) inserting the core body in the passage of the fibrous preform.

8. The method according to claim 6, wherein step B comprises at least the following steps:
  b1') manufacturing the core portions separately, among which at least one first core portion includes or forms a respective core body portion; then
  b2') inserting at least the core body portion of the first core portion in the passage of the fibrous preform, then
  b3') connecting the core portions to each other or to one another, joining the respective ends of the core portions sealingly, so that the core portions conjointly form the core, and so that at least the core body portion of the first core portion forms the core body of the core.

9. The method according to claim 8, wherein at least a second core portion, among the core portions manufactured at the step b1', includes or forms a respective core body portion, the step b2' furthermore comprises inserting the core body portion of the second core portion in the passage of the fibrous preform, and connecting the core portions to one another at the step b3' comprises at least connecting the second core portion to the first core portion by joining the respective junction ends of the respective core body portions of the first and second core portions sealingly in the passage.

10. The method according to claim 9, wherein the respective junction ends of the respective core body portions of the first and second core portions intercept two opposite openings of the passage, at the end of the step b3'.

11. The method according to claim 9, wherein the respective junction ends of the respective core body portions of the first and second core portions extend substantially transversely to a span direction of the core, at the end of the step b3'.

12. The method according to claim 9, wherein the closed cavity of the core formed at the step b2' is formed conjointly by two respective open cavities of the first and second core portions manufactured at the step b1', the two open cavities each opening out in the corresponding junction end.

13. The method according to claim 8, wherein two core portions, among the core portions manufactured at the step b1', each include or form a corresponding end part of the core having a splayed shape as far as a corresponding end of the core.

14. The method according to claim 6, wherein the step A comprises manufacturing the fibrous preform by three-dimensional weaving, by weaving weft threads through a cluster of warp threads arranged in a plurality of layers, and by practising a partial non-interlinking between two layers of warp threads, so that said partial non-interlinking forms the passage separating the two portions of the fibrous preform.

* * * * *